(12) United States Patent
Sugita

(10) Patent No.: US 8,651,746 B2
(45) Date of Patent: Feb. 18, 2014

(54) ROLLING BEARING

(75) Inventor: Yoshifumi Sugita, Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 13/699,789

(22) PCT Filed: Jan. 17, 2012

(86) PCT No.: PCT/JP2012/050855
§ 371 (c)(1),
(2), (4) Date: Nov. 26, 2012

(87) PCT Pub. No.: WO2012/099120
PCT Pub. Date: Jul. 26, 2012

(65) Prior Publication Data
US 2013/0071056 A1 Mar. 21, 2013

(30) Foreign Application Priority Data
Jan. 19, 2011 (JP) .................................. 2011-008872

(51) Int. Cl.
*F16C 33/38* (2006.01)

(52) U.S. Cl.
USPC ............................ 384/523; 384/470; 384/450

(58) Field of Classification Search
USPC ........................................ 384/523, 470, 450
See application file for complete search history.

(56) References Cited

U.S. PATENT DOCUMENTS

| | | | |
|---|---|---|---|
| 5,522,667 A * | 6/1996 | Miyake ......................... | 384/492 |
| 5,553,949 A * | 9/1996 | Fukuwaka et al. ............ | 384/523 |

(Continued)

FOREIGN PATENT DOCUMENTS

| | | |
|---|---|---|
| JP | 200112476 A | 1/2001 |
| JP | 2002235750 A | 8/2002 |

(Continued)

OTHER PUBLICATIONS

International Search Report (PCT/ISA/210 and PCT/ISA/220) dated Apr. 17, 2012 issued by the International Searching Authority in counterpart International Application No. PCT/JP2012/050855.

(Continued)

*Primary Examiner* — Thomas R Hannon
(74) *Attorney, Agent, or Firm* — Sughrue Mion, PLLC

(57) ABSTRACT

The present invention provides a rolling bearing capable of suppressing the generation of retainer noise and abnormal vibration by specifying the circumferential width of axial grooves formed on the guide face of an outer ring guide retainer or an inner ring guide retainer. In a rolling bearing 1 according to the present invention, axial grooves 13 are formed on the outer circumferential face of the outer ring guide type retainer 10 thereof. The displacement amount xo of the center position of the retainer 10, the outer diameter Doc of the retainer 10, the guide diameter Dog of the outer ring 2, the circumferential width h of the axial grooves 13, the guide clearance ΔLc between the outer ring 2 and the retainer 10, and the clearance ΔP between the pocket 11 and the rolling element 4 satisfy the following relational expressions:

[Mathematical expression 1]
$$x_o = \frac{1}{2}\left(D_{oc} - D_{og} + \sqrt{D_{og}^2 - h^2} - \sqrt{D_{oc}^2 - h^2}\right) \quad (1)$$

[Mathematical expression 2]
$$\frac{\Delta L_o + 2x_o}{\Delta P} < 1 \quad (2)$$

are satisfied.

2 Claims, 12 Drawing Sheets

(56) References Cited

U.S. PATENT DOCUMENTS

| | | | |
|---|---|---|---|
| 5,642,945 A * | 7/1997 | Abe | 384/470 |
| 6,692,156 B1 * | 2/2004 | Ohura et al. | 384/523 |
| 2002/0110298 A1 * | 8/2002 | Tada | 384/523 |

FOREIGN PATENT DOCUMENTS

| | | |
|---|---|---|
| JP | 2002349580 A | 12/2002 |
| JP | 2004301314 A | 10/2004 |
| JP | 2006329233 A | 12/2006 |
| JP | 2010196861 A | 9/2010 |

OTHER PUBLICATIONS

The Written Opinion (PCT/ISA/237) of the International Searching Authority dated Apr. 17, 2012 issued in counterpart International Application No. PCT/JP2012/050855.

* cited by examiner

ROLLING BEARING

TECHNICAL FIELD

The present invention relates to a rolling bearing, more particularly, to a rolling bearing equipped with an outer ring guide type or inner ring guide type retainer.

BACKGROUND ART

When a rolling bearing incorporating an outer ring guide type retainer rotates, in a case that the retainer is not tilted with respect to the outer ring thereof, the bearing rotates while the outer circumferential face of the retainer makes line contact with the inner circumferential guide face of the outer ring. Furthermore, when the rolling bearing incorporating the outer ring guide type retainer rotates, in a case that the retainer is tilted with respect to the outer ring thereof, the bearing rotates while the outer circumferential face of the retainer makes point contact with the inner circumferential guide face of the outer ring. In this kind of outer ring guide type retainer, concave sections (grooves) extending on the outer circumferential face of the retainer in the axial direction are formed in some cases to improve oil draining performance and to improve running-in performance for grease lubrication (for example, refer to Patent Document 1).

RELATED ART REFERENCE

Patent Reference

Patent Document 1: JP-A-2002-349580

SUMMARY OF THE INVENTION

Problem to be Solved by the Invention

However, in a case that grooves are formed on the outer circumferential face of an outer ring guide type retainer, the center position of the retainer is displaced depending on whether which portion of the outer circumferential face of the retainer makes contact with the guide face of the outer ring. In a case that the circumferential width of the groove is large, the center position of the retainer is displaced significantly; hence, the behavior of the retainer becomes unstable and there is a danger that the retainer may vibrate abnormally. If the behavior of the retainer becomes unstable, irregular interference occurs between a pocket for retaining a rolling element and the rolling element and there is a danger that retainer noise may be generated. Patent Document 1 does not describe anything about the displacement of the center position of the retainer and the behavior of the retainer depending on the circumferential width of the groove.

In consideration of the above-mentioned circumstances, an object of the present invention is to provide a rolling bearing capable of suppressing occurrence of abnormal vibration in the retainer and retainer noise by specifying the circumferential width of grooves formed on the guide face of an outer ring guide type retainer or an inner ring guide type retainer.

Means for Solving the Problem

The above-mentioned object of the present invention is attained by the configuration described below.

(1) A rolling bearing equipped with an outer ring; an inner ring; a plurality of rolling elements disposed between the outer ring and the inner ring; and an outer ring guide type retainer having a plurality of pockets for retaining the plurality of rolling elements at predetermined intervals in the circumferential direction, wherein grooves extending in the axial direction are formed on the outer circumferential face of the retainer, and in a case that the displacement amount of the center position of the retainer is xo, the outer diameter of the retainer is Doc, the guide diameter of the outer ring is Dog, the circumferential width of the groove is h, the guide clearance between the outer ring and the retainer is $\Delta Lc$, and the clearance between the pocket and the rolling element is $\Delta P$, the following relational expressions:

[Mathematical expression 1]

$$x_o = \frac{1}{2}\left(D_{oc} - D_{og} + \sqrt{D_{og}^2 - h^2} - \sqrt{D_{oc}^2 - h^2}\right) \quad (1)$$

[Mathematical expression 2]

$$\frac{\Delta L_o + 2x_o}{\Delta P} < 1 \quad (2)$$

are satisfied.

(2) A rolling bearing equipped with an outer ring; an inner ring; a plurality of rolling elements disposed between the outer ring and the inner ring; and an inner ring guide type retainer having a plurality of pockets for retaining the plurality of rolling elements at predetermined intervals in the circumferential direction, wherein grooves extending in the axial direction are formed on the inner circumferential face of the retainer, and in a case that the displacement amount of the center position of the retainer is xi, the inner diameter of the retainer is Dic, the guide diameter of the inner ring is Dig, the circumferential width of the groove is h, the guide clearance between the inner ring and the retainer is $\Delta Li$, and the clearance between the pocket and the rolling element is $\Delta P$, the following relational expressions:

[Mathematical expression 3]

$$x_i = \frac{1}{2}\left(D_{ig} - D_{ic} + \sqrt{D_{ic}^2 - h^2} - \sqrt{D_{ig}^2 - h^2}\right) \quad (3)$$

[Mathematical expression 4]

$$\frac{\Delta L_i + 2x_i}{\Delta P} < 1 \quad (4)$$

are satisfied.

Advantage of the Invention

With the rolling bearing according to the present invention, the displacement of the retainer in the radial direction is restricted, whereby the behavior of the retainer can be stabilized. Furthermore, a clearance is securely obtained between the pocket of the retainer and the rolling element, whereby the generation of retainer noise can be prevented.

MODES FOR CARRYING OUT THE INVENTION

Embodiments of rolling bearings according to the present invention will be described below in detail on the basis of the drawings.

First Embodiment

Figure 1:
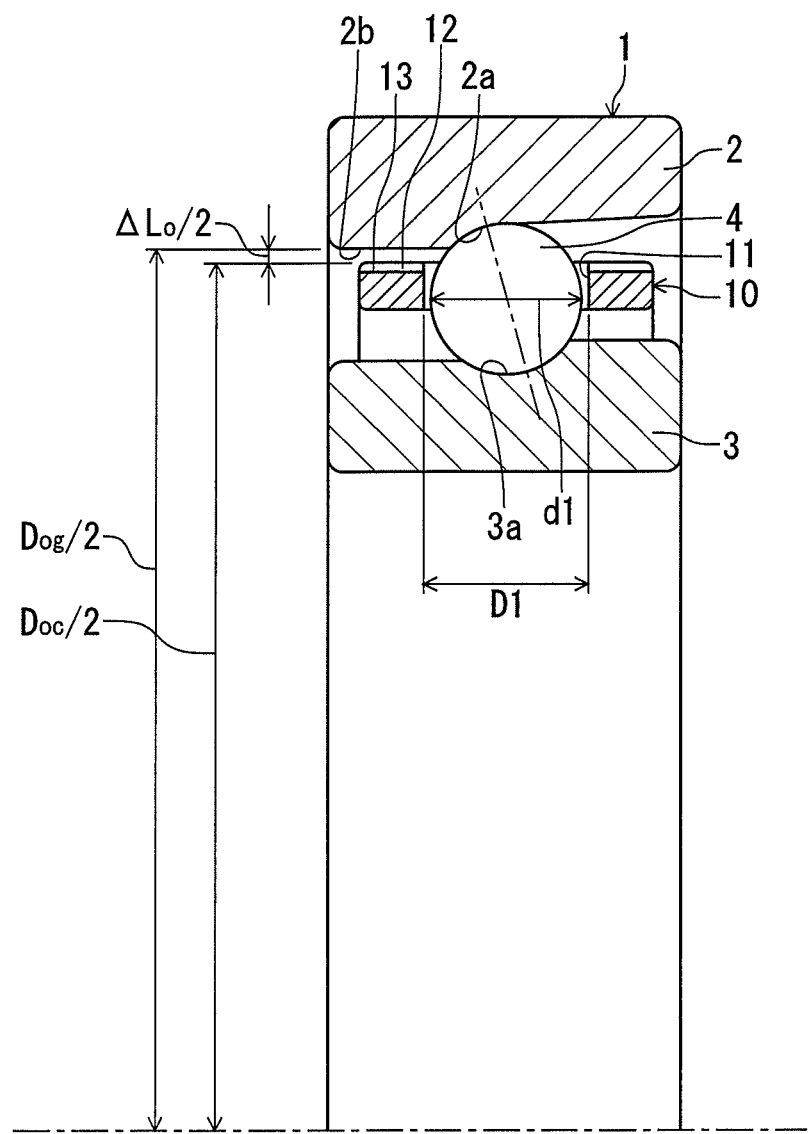
FIG. 1 is a sectional view showing an angular ball bearing incorporating an outer ring guide type retainer according to a first embodiment of the present invention.

First, a rolling bearing according to a first embodiment will be described using FIGS. 1 to 5. As shown in FIG. 1, an angular ball bearing 1 according to the first embodiment is equipped with an outer ring 2 having an outer ring track face 2a on the inner circumferential face thereof; an inner ring 3 having an inner ring track face 3a on the outer circumferential face thereof; a plurality of balls 4 disposed between the outer ring track face 2a of the outer ring 2 and the inner ring track face 3a of the inner ring 3; and a retainer 10 for retaining the plurality of balls 4 at predetermined intervals in the circumferential direction.

Figure 2A:
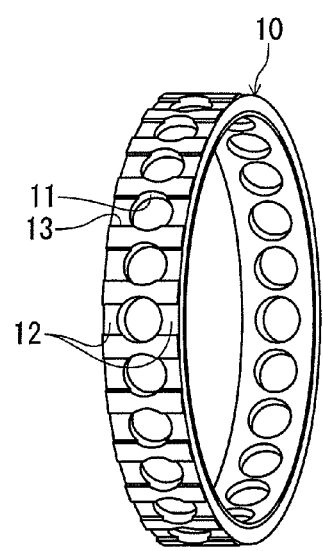
FIG. 2(a) is a perspective view showing the retainer shown in FIG. 1.
Figure 2B:
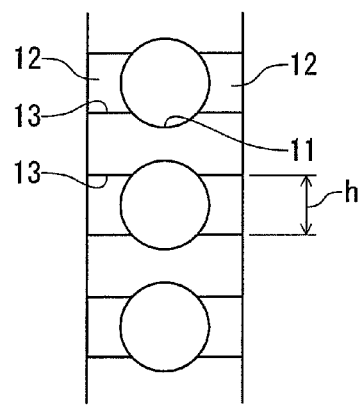
FIG. 2(b) is a partial front view thereof.

As shown in FIG. 2, the retainer 10 has a plurality of pockets 11 formed at predetermined intervals in the circumferential direction. The retainer 10 is an outer ring guide type in which a ring section 12, that is, one of a pair of ring sections 12 located on both sides in the axial direction, is guided by the inner circumferential face 2b on the anti-counter bore side of the outer ring track face 2a of the outer ring 2. Furthermore, on the outer circumferential face of the retainer 10, a plurality of grooves 13 extending in the axial direction are formed at positions corresponding to the pockets 11 at predetermined intervals in the circumferential direction. Thanks to these grooves 13, the performance of discharging grease or lubricating oil can be improved and it is possible to solve problems, such as an extended initial running-in operation period, seizure due to self-excited vibration of the retainer and abnormal temperature rising of the bearing during rotation, and instability of temperature.

Figure 3:
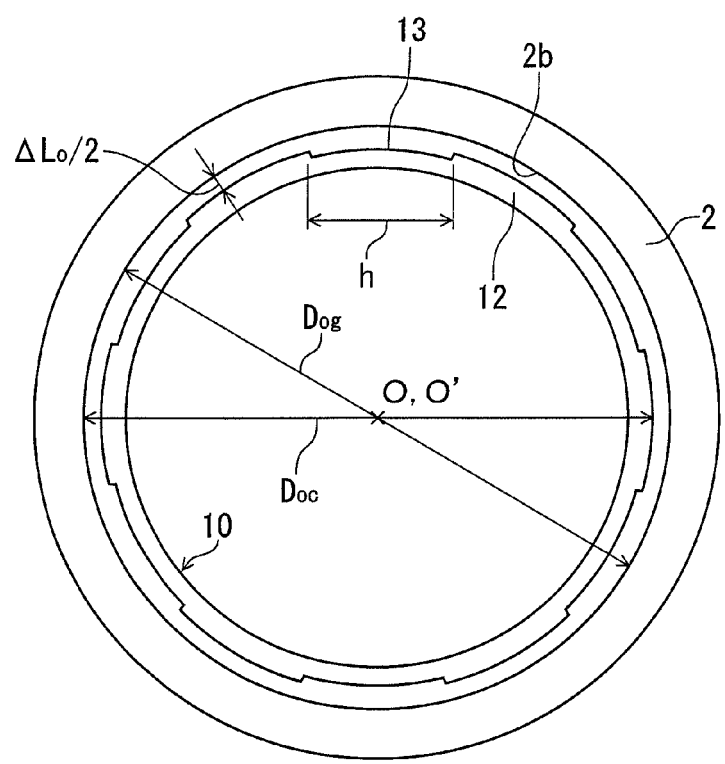
FIG. 3 is a schematic view showing the positional relationship between the outer ring guide type retainer and the outer ring.

As shown in FIG. 3, at the non-rotating time of the angular ball bearing 1, a clearance $\Delta Lo/2$ is present between the outer circumferential face of the ring section 12 of the retainer 10 and the inner circumferential face 2b of the outer ring 2, and the center O' of the retainer 10 is coincident with the center O of the outer ring 2. The guide clearance $\Delta Lo$ between the outer ring 2 and the retainer 10 is obtained by (the guide diameter of the outer ring 2 (the diameter of the inner circumferential face 2b) Dog)−(the outer diameter Doc of the retainer).

When the angular ball bearing 1 rotates, in a case that the retainer 10 is not tilted with respect to the outer ring 2, the outer circumferential face of the ring section 12 of the retainer 10 makes line contact with the inner circumferential face 2b of the outer ring 2, whereby the retainer 10 is guided by the outer ring 2. Furthermore, in a case that the retainer 10 is tilted with respect to the outer ring 2, the outer circumferential face of the ring section 12 of the retainer 10 makes point contact with the inner circumferential face 2b of the outer ring 2, whereby the retainer 10 is guided by the outer ring 2. In a case that the retainer 10 is guided at the portion (the midpoint of the two grooves 13 and 13) most away from the grooves 13 on the outer circumferential face of the ring section 12 of the retainer 10, the center O' of the retainer 10 is displaced by $\Delta Lo$ from the center O of the outer ring 2 (see FIG. 4).

On the other hand, in a case that the retainer 10 is guided at the two portions, close to the grooves 13, on the outer circumferential faces of the ring sections 12 of the retainer 10 (see FIG. 5), the retainer 10 approaches closest to the outer ring 2. Hence, the center O' of the retainer 10 is displaced further, and the displacement amount of the center O' of the retainer 10 from the center O of the outer ring 2 becomes $\Delta Lo + xo$.

Figure 4:
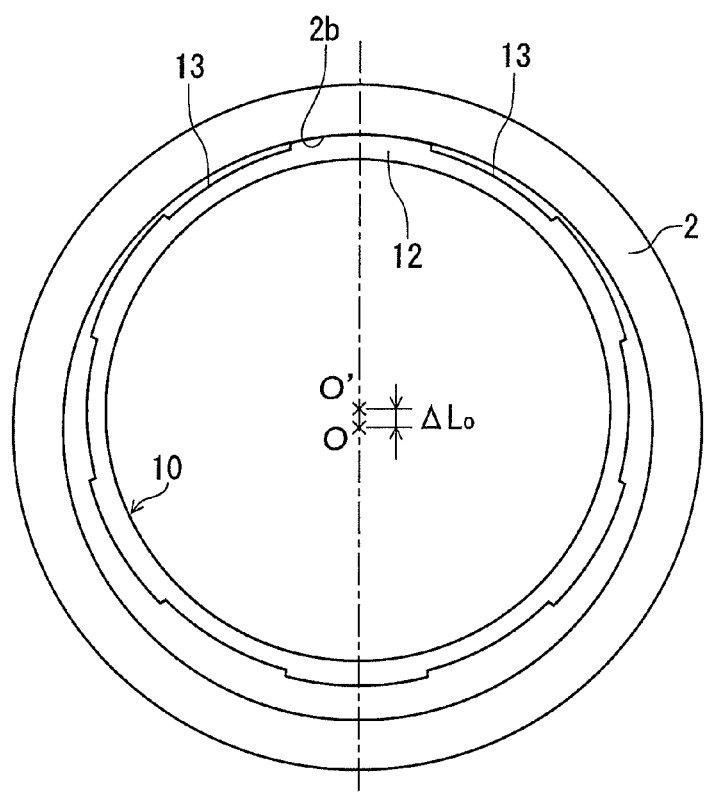
FIG. 4 is a schematic view showing an example of the displacement state of the outer ring guide type retainer.
Figure 5:
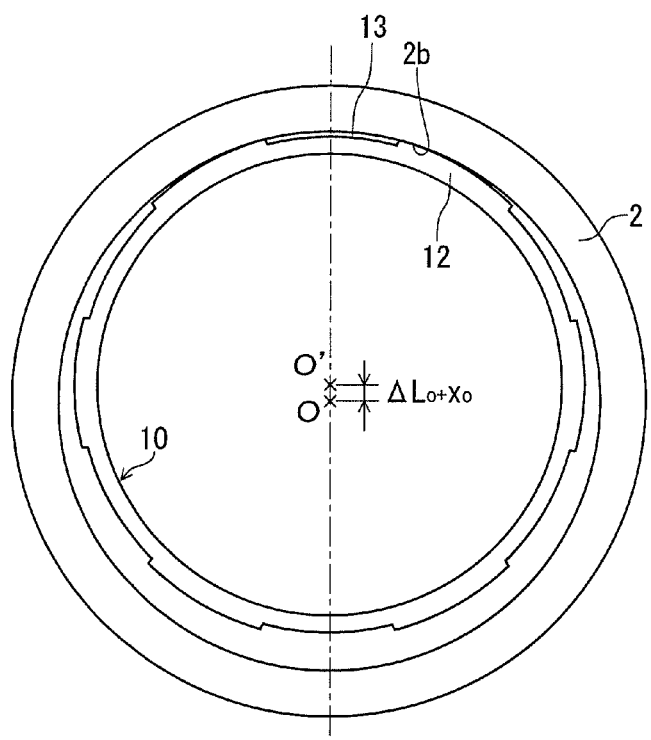
FIG. 5 is a schematic view showing another example of the displacement state of the outer ring guide type retainer.

When the angular ball bearing 1 is rotated from the state shown in FIG. 4 to the state shown in FIG. 5, the center O' of the retainer 10 is displaced in the range of xo as described above. The displacement amount xo of the center O' of the retainer 10 becomes larger as the circumferential width h of the groove 13 increases and can be represented by the following expression (1).

[Mathematical expression 5]

$$x_o = \tfrac{1}{2}(D_{oc} - D_{og} + \sqrt{D_{og}^2 - h^2} - \sqrt{D_{oc}^2 - h^2}) \tag{1}$$

As the displacement amount xo of the center O' of the retainer 10 becomes larger, the behavior of the retainer 10 becomes unstable and there is a danger that abnormal vibration occurs in the retainer 10. Furthermore, when the behavior of the retainer 10 becomes unstable, irregular interference occurs between each pocket 11 of the retainer 10 and a ball 4 and there is a danger that retainer noise is generated. For the purpose of suppressing the unstable behavior of the retainer 10, it is supposed that the displacement amount xo of the center O' of the retainer 10 and the clearance $\Delta P$ between the pocket 11 and the ball 4 satisfy the relationship of the following expression (2). The clearance $\Delta P$ between the pocket 11 and the ball 4 is obtained by (the axial width D1 of the pocket 11)−(the diameter d1 of the ball 4) (see FIG. 1).

[Mathematical expression 6]

$$\frac{\Delta L_o + 2x_o}{\Delta P} < 1 \quad (2)$$

As described above, in this embodiment, the circumferential width h of the groove 13 is set so that the displacement amount xo of the center O' of the retainer 10 satisfies the above-mentioned expressions (1) and (2), whereby the displacement of the retainer 10 in the radial direction is restricted. Hence, the behavior of the retainer 10 can be stabilized. In addition, the clearance between the pocket 11 of the retainer 10 and the ball 4 is obtained securely, whereby the generation of retainer noise can be prevented.

Furthermore, it is desired that the displacement amount xo of the center position of the retainer 10 should be smaller than the roundness of the outer diameter of the retainer 10 obtained by the radius method. In this way, the behavior of the retainer 10 can be stabilized by restricting the displacement of the retainer 10 in the radial direction.

As described above, in the angular ball bearing 1 according to the first embodiment, the behavior of the retainer 10 can be stabilized by restricting the displacement of the retainer 10 in the radial direction. When the inner ring and the outer ring of a ball bearing rotate without tilting, the load balance between each ball and the inner and outer rings is usually uniform, whereby the orbital speeds of the respective rolling elements inside the bearing become theoretically equal. In a case that the respective balls are not distributed equally in the circumferential direction, for example, in the initial stage of rotation, interference may occur between each of some balls and the pocket. However, the ball is gradually moved to the center of the pocket by the running-in effect due to the interference; as a result, the balls become stable in a state in which the balls are equally distributed in the circumferential direction. In this way, the balls usually rotate smoothly without being restrained inside the pockets. In a case that the bearing rotates at high speed, the retainer is pushed to the guide face of the outer ring (the inner circumferential face of the outer ring) by a centrifugal force; however, if the displacement amount between the orbital center of the balls (the center of the bearing) and the orbital center of the retainer is large at this time, interference occurs between the ball and the face of the pocket before the retainer makes contact with the guide face of the outer ring. In this case, the ball irregularly collides with the pocket and retainer noise is generated eventually. Since the angular ball bearing 1 according to the first embodiment satisfies the expression (2), a clearance is securely obtained between the pocket 11 and the ball 4, whereby irregular collision between the pocket 11 and the ball 4 is suppressed and the generation of retainer noise can be prevented.

Second Embodiment

Figure 6:
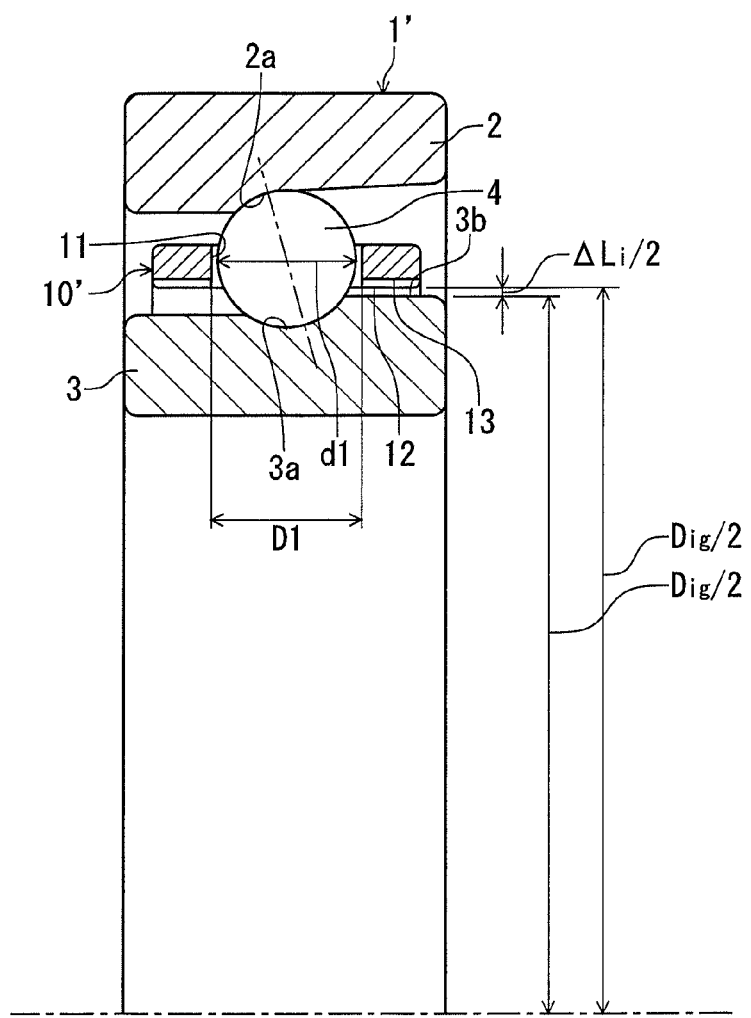
FIG. 6 is a sectional view showing an angular ball bearing incorporating an inner ring guide type retainer according to a second embodiment of the present invention.

Next, a rolling bearing according to a second embodiment of the present invention will be described on the basis of FIGS. 6 to 9. FIG. 6 is an enlarged sectional view showing the main components of an angular ball bearing 1' according to the second embodiment. Since the angular ball bearing 1' according to the second embodiment is similar to the angular ball bearing 1 according to the first embodiment except that the retainer thereof is an inner ring guide type, the same components are designated by the same or similar numerals or signs and their descriptions are simplified or omitted.

As shown in FIG. 6, the retainer 10' of the angular ball bearing 1' according to the second embodiment is an inner ring guide type in which a ring section 12, that is, one of a pair of ring sections 12 located on both sides in the axial direction, is guided by the outer circumferential face 3b of the inner ring 3. On the inner circumferential face of the retainer 10', a plurality of grooves 13 extending in the axial direction are formed at positions corresponding to pockets 11 at predetermined intervals in the circumferential direction.

Figure 7:
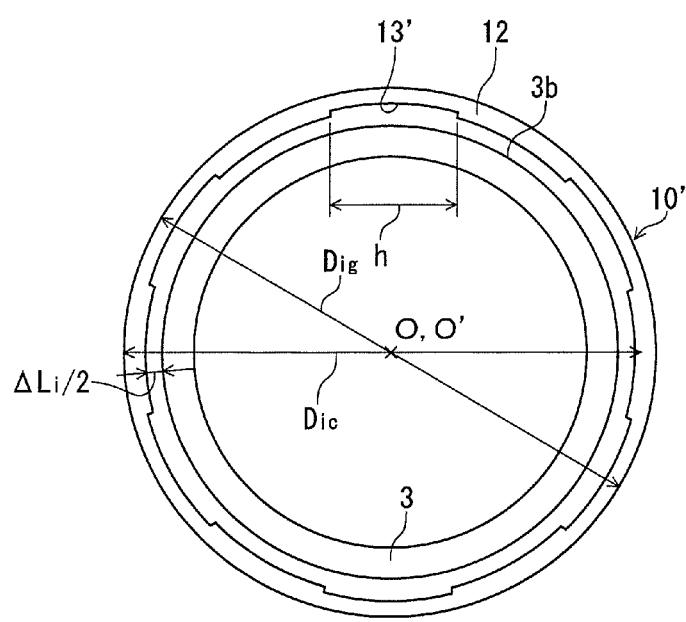
FIG. 7 is a schematic view showing the positional relationship between the inner ring guide type retainer the inner ring.

As shown in FIG. 7, at the non-rotating time of the angular ball bearing 1', a clearance $\Delta Li/2$ is present between the inner circumferential face of the ring section 12 of the retainer 10' and the outer circumferential face 3b of the inner ring 3, and the center O of the inner ring is coincident with the center O' of the retainer 10'. The guide clearance $\Delta Li$ between the inner ring 3 and the retainer 10' is obtained by (the guide diameter of the inner ring 3 (the diameter of the outer circumferential face 3b) Dig)–(the inner diameter Dic of the retainer 10').

When the angular ball bearing 1' rotates, in a case that the retainer 10' is not tilted with respect to the inner ring 3, the inner circumferential face of the ring section 12 of the retainer 10' makes line contact with the outer circumferential face 3b of the inner ring 3, whereby the retainer 10' is guided by the inner ring 3. Furthermore, in a case that the retainer 10' is tilted with respect to the inner ring 3, the inner circumferential face of the ring section 12 of the retainer 10' makes point contact with the outer circumferential face 3b of the inner ring 3, whereby the retainer 10' is guided by the inner ring 3. In a case that the retainer 10' is guided at the portion (the midpoint of the two grooves 13 and 13) most away from the grooves 13 on the inner circumferential face of the ring section 12 of the retainer 10', the center O' of the retainer 10' is displaced by $\Delta Li$ from the center O of the inner ring 3 (see FIG. 8).

On the other hand, in a case that the retainer 10' is guided at the two portions, close to the grooves 13, on the inner circumferential faces of the ring sections 12 of the retainer 10' (see FIG. 9), the retainer 10' approaches closest to the inner ring 3. Hence, the center O' of the retainer 10' is displaced further, and the displacement amount of the center O' of the retainer 10' from the center O of the inner ring 3 becomes $\Delta Li+xi$.

Figure 8:
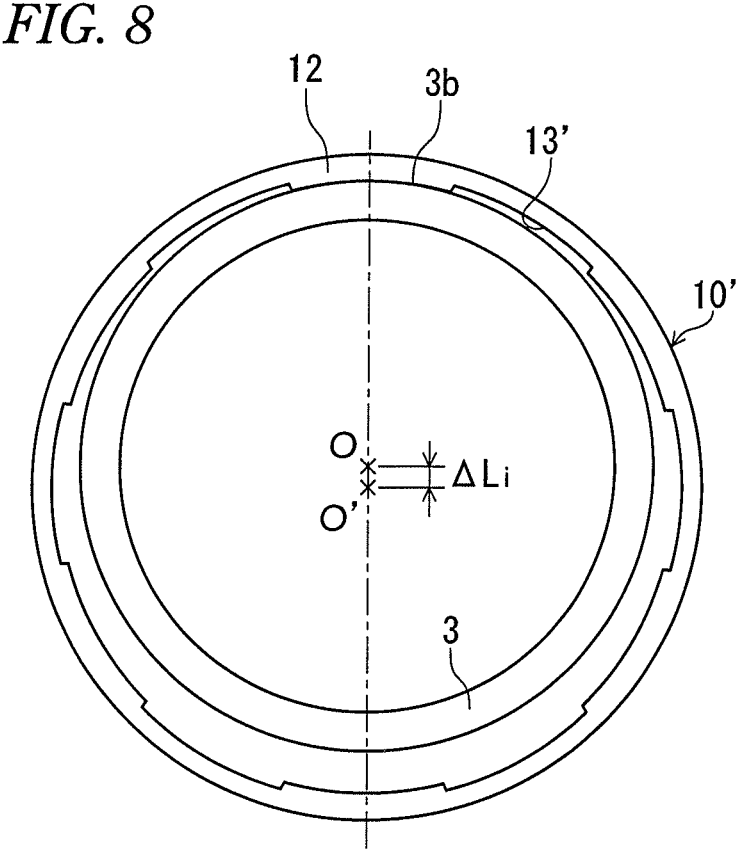
FIG. 8 is a schematic view showing an example of the displacement state of the inner ring guide type retainer.
Figure 9:
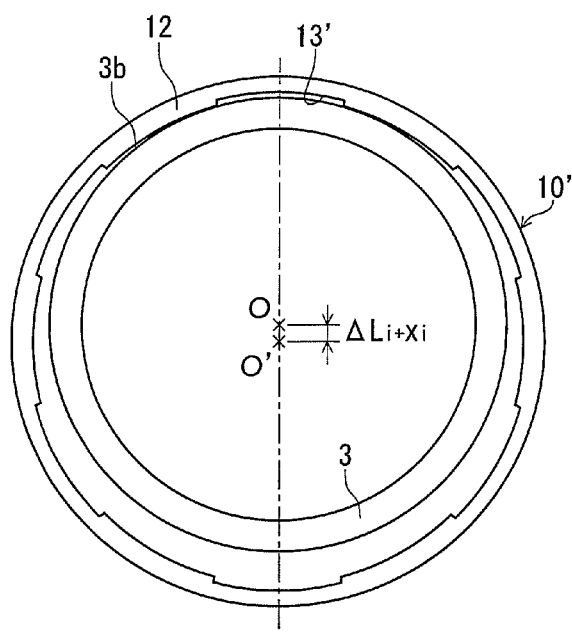
FIG. 9 is a schematic view showing another example of the displacement state of the inner ring guide type retainer.

When the angular ball bearing 1' is rotated from the state shown in FIG. 8 to the state shown in FIG. 9, the center O' of the retainer 10' is displaced in the range of xi as described above. The displacement amount xi of the center O' of the retainer 10' becomes larger as the circumferential width h of the groove 13 increases and can be represented by the following expression (3).

[Mathematical expression 7]

$$x_i = \frac{1}{2}(D_{ig} - D_{ic} + \sqrt{D_{ic}^2 - h^2} - \sqrt{D_{ig}^2 - h^2}) \quad (3)$$

As the displacement amount xi of the center O' of the retainer 10' becomes larger, the behavior of the retainer 10' becomes unstable and there is a danger that abnormal vibration occurs in the retainer 10'. Furthermore, when the behavior of the retainer 10' becomes unstable, irregular interference occurs between each pocket 11 of the retainer 10' and the ball 4 and there is a danger that retainer noise is generated. For the purpose of suppressing the unstable behavior of the retainer 10', it is supposed that the displacement amount xi of the center O' of the retainer 10' and the clearance ΔP between the pocket 11 and the ball 4 satisfy the relationship of the following expression (4). The clearance ΔP between the pocket 11 and the ball 4 is obtained by (the axial width D1 of the pocket 11)−(the diameter d1 of the ball 4) (see FIG. 6).

[Mathematical expression 8]

$$\frac{\Delta L_i + 2x_i}{\Delta P} < 1 \quad (4)$$

As described above, in this embodiment, the circumferential width h of the groove 13 is set so that the displacement amount xi of the center O' of the retainer 10' satisfies the above-mentioned expressions (3) and (4), whereby the displacement of the retainer 10' in the radial direction is restricted. Hence, the behavior of the retainer 10' can be stabilized. In addition, the clearance between the pocket 11 of the retainer 10' and the ball 4 is obtained securely, whereby the generation of retainer noise can be prevented.

Furthermore, it is desired that the displacement amount xi of the center position of the retainer 10' should be smaller than the roundness of the inner diameter of the retainer 10' obtained by the radius method. In this way, the behavior of the retainer 10' can be stabilized by restricting the displacement of the retainer 10' in the radial direction.

As described above, in the angular ball bearing 1' according to the second embodiment, the behavior of the retainer 10' can be stabilized by restricting the displacement of the retainer 10' in the radial direction. Furthermore, the generation of retainer noise can be prevented by securely obtaining the clearance between the pocket 11 of the retainer 10' and the ball 4.

The present invention is not limited to the above-mentioned embodiments but can be modified, improved, etc. appropriately. The present invention can be used favorably for not only angular ball bearings but also cylindrical roller bearings and the like.

EXAMPLE 1

In Example 1, three angular ball bearings having outer ring guide type retainers were tested with respect to the relationship between the circumferential width of a groove formed on the outer circumferential face of the retainer and extending in the axial direction and the displacement amount of the center of the retainer. Table 1 shows the inner diameter of the bearing, the outer diameter of the bearing, the guide clearance ΔLo, and the pocket clearance ΔP in each of bearing A (angular ball bearing (40BNR10H)), bearing B (angular ball bearing (70BNR10H)), and bearing C (angular ball bearing (100BNR10H)), equipped with an outer ring guide type retainer. In addition, Table 1 shows the upper limit value of the displacement amount Δxo that is obtained by the expression (2) on the basis of the guide clearance ΔLo and the pocket clearance ΔP.

TABLE 1

|  | Inner diameter of Bearing (mm) | Outer diameter of Bearing (mm) | Guide clearance ΔLo (mm) | Pocket clearance ΔP (mm) | Upper limit of displacement Δxo (mm) | Outer diameter of Retainer Doc (mm) | Inner diameter of Outer ring guide Dog (mm) |
|---|---|---|---|---|---|---|---|
| Bearing A | 40 | 68 | 0.5 | 0.52 | 0.01 | 56 | 56.5 |
| Bearing B | 70 | 110 | 0.54 | 0.58 | 0.015 | 93.46 | 94 |
| Bearing C | 100 | 150 | 0.65 | 0.7 | 0.02 | 130.35 | 131 |

Figure 10:
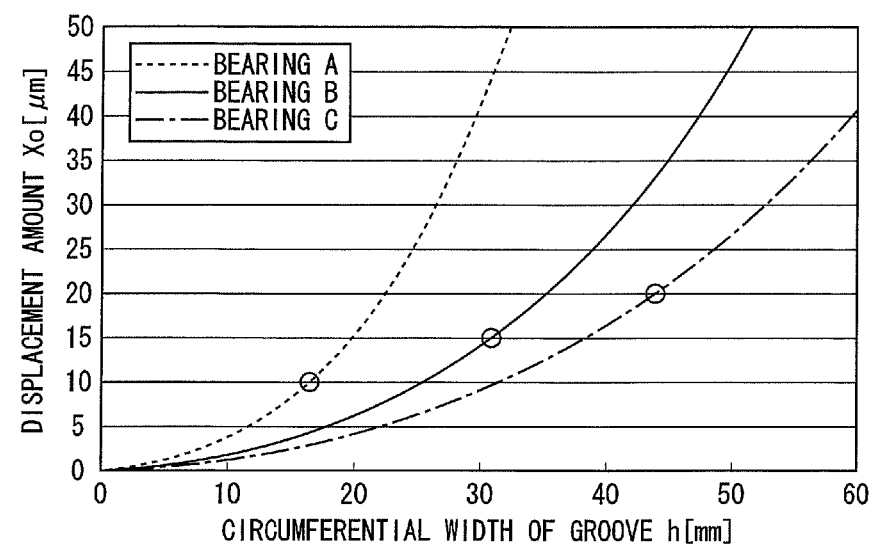
FIG. 10 is a graph showing the displacement amount of the retainer depending on the circumferential width of a groove in Example 1.

Furthermore, FIG. 10 shows the displacement amount xo, obtained by the expression (1), of the center of the retainer depending on the circumferential width h of the groove formed on the outer circumferential face of the retainer of each of the bearing A, bearing B and bearing C. According to the graph of FIG. 10 and the upper limit value of the displacement amount Δxo, it is found that the retainer is guided stably by the outer ring, provided that the circumferential width h of the axial groove formed on the outer circumferential face of the retainer is 15.5 mm or less in the case of the bearing A, 30 mm or less in the case of the bearing B or 43.5 mm or less in the case of the bearing C.

EXAMPLE 2

Figure 11:
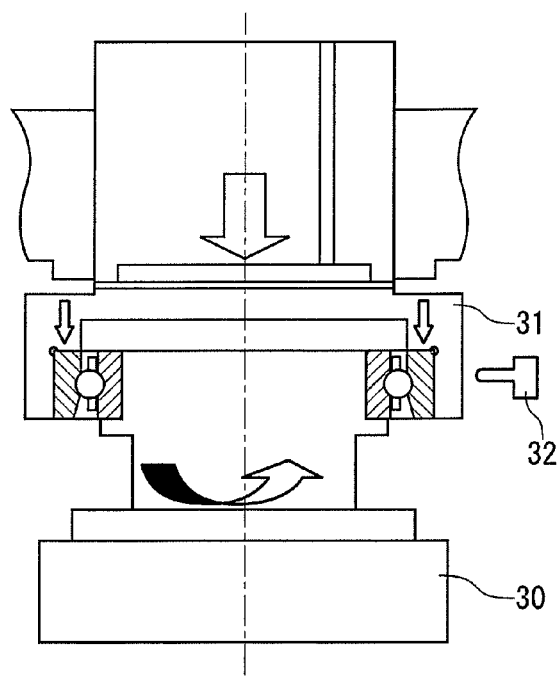
FIG. 11 is a view showing a measuring apparatus for use in Example 2.

In Example 2, a preload (axial load: 150 N) was applied to an angular ball bearing (70BNR10H) having an inner diameter of 70 mm using the apparatus shown in FIG. 11 with the outer ring secured to a housing 31 and with the outer ring (the housing 31) being free in the radial direction. Then, the inner ring was rotated at 3600 to 12600 min$^{-1}$ using a highly-accurate air spindle 30, and the displacement of the outer ring (the housing 31) in the radial direction was measured using a non-contact displacement meter 32. A retainer a having no groove on the outer circumferential face thereof according to a conventional embodiment and retainers b to e having grooves on the outer circumferential face thereof according to the embodiment of the present invention were used, all the retainers being an outer ring guide type. Table 2 shows the guide clearance ΔLo, the pocket clearance ΔP, and ΔLo/ΔP of each of the retainers a to e.

TABLE 2

| Retainer | Pocket clearance ΔP (mm) | Guide clearance ΔLo (mm) | ΔLo/ΔP | Vibration component (nm) depending on revolutions (m$^{-1}$) | | | | | |
|---|---|---|---|---|---|---|---|---|---|
| | | | | 3600 m$^{-1}$ | 5400 m$^{-1}$ | 7200 m$^{-1}$ | 9000 m$^{-1}$ | 10800 m$^{-1}$ | 12600 m$^{-1}$ |
| a | 0.55 | 0.55 | 1 | 22 | 35 | 71 | 106 | 191 | 319 |
| b | 0.3 | 0.25 | 0.83 | 11 | 14 | 29 | 72 | 114 | 206 |
| c | 0.4 | 0.25 | 0.63 | 22 | 21 | 36 | 79 | 104 | 164 |
| d | 0.15 | 0.15 | 0.5 | 16 | 17 | 35 | 56 | 86 | 133 |
| e | 0.25 | 0.25 | 0.45 | 8 | 15 | 26 | 50 | 0 | 115 |

Figure 12:
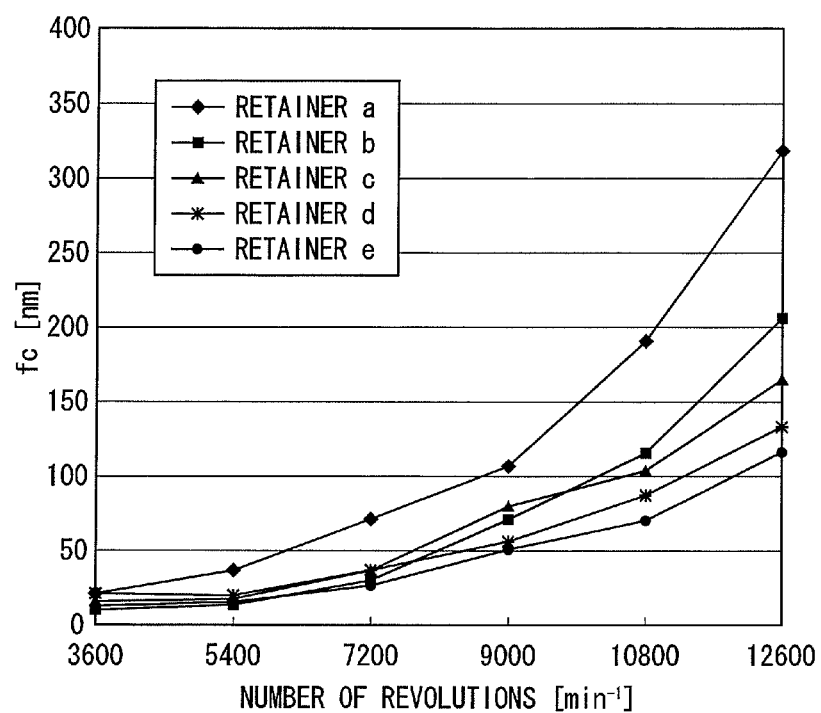
FIG. 12 is a graph showing the vibration components fc of the retainers in Example 2.

Furthermore, the vibration components (fc) of the retainers a to e were obtained using FFT analysis from the radial displacement of the outer ring (the housing 31) measured using the non-contact displacement meter 32, and the results are shown in Table 2 and FIG. 12. It is found from the results that the vibration component (fc) of the retainer a in which the pocket clearance ΔP is nearly equal to the guide clearance ΔLc is large in a case that the number of revolutions is 9000 min$^{-1}$ or more.

In the retainer a having no groove on the outer circumferential face thereof, the radial movement amount of the retainer is nearly equal to the guide clearance ΔLc. On the other hand, in the retainers b to e having grooves on the outer circumferential faces thereof, the substantial guide clearance, that is, the radial movement amount of each retainer, is ΔLo+2xo. Therefore, in a case that the grooves are formed on the outer circumferential face of the retainer, the guide clearance ΔLo, the pocket clearance ΔP, and the displacement amount xo of the center of the retainer satisfy the following expression (2) and further preferably satisfies the following expression (5), whereby it is found that the vibration of the retainer can be suppressed.

[Mathematical expression 9]

$$\frac{\Delta L_o + 2x_o}{\Delta P} < 1 \quad (2)$$

[Mathematical expression 10]

$$\frac{\Delta L_o + 2x_o}{\Delta P} \leq 0.5 \quad (5)$$

INDUSTRIAL APPLICABILITY

The present invention is used favorably for the spindle bearings of machine tools, for example.

Although the embodiments and examples of the present invention has been described above, the present invention is not limited to the above-mentioned embodiments, but can be modified variously and embodied within the scope of the appended claims. This application is based on Japanese Patent Application (Patent Application No. 2011-008872) filed on Jan. 19, 2011, the entire contents of which are hereby incorporated by reference.

DESCRIPTION OF REFERENCE NUMERALS AND SIGNS 1, 1' angular ball bearing
2 outer ring
3 inner ring
4 ball
10, 10' retainer
11 pocket
13, 13' groove
O center of outer ring
O' center of retainer
xo, xi displacement amount of center of retainer
Doc outer diameter of retainer
Dic inner diameter of retainer
Dog guide diameter of outer ring
Dig guide diameter of inner ring
h circumferential width of axial groove
ΔLo guide clearance between outer ring and retainer
ΔLi guide clearance between inner ring and retainer
ΔP pocket clearance

The invention claimed is:

1. A rolling bearing comprising: an outer ring; an inner ring; a plurality of rolling elements disposed between the outer ring and the inner ring; and an outer ring guide type retainer having a plurality of pockets for retaining the plurality of rolling elements at predetermined intervals in the circumferential direction, wherein grooves extending in the axial direction are formed on the outer circumferential face of the retainer, and in a case that the displacement amount of the center of the retainer is xo, the outer diameter of the retainer is Doc, the guide diameter of the outer ring is Dog, the circumferential width of the groove is h, the guide clearance between the outer ring and the retainer is ΔLc, and the clearance between the pocket and the rolling element is ΔP, the following relational expressions:

[Mathematical expression 1]

$$x_o = \frac{1}{2}\left(D_{oc} - D_{og} + \sqrt{D_{og}^2 - h^2} - \sqrt{D_{oc}^2 - h^2}\right) \quad (1)$$

[Mathematical expression 2]

$$\frac{\Delta L_o + 2x_o}{\Delta P} < 1 \quad (2)$$

are satisfied.

2. A rolling bearing comprising: an outer ring; an inner ring; a plurality of rolling elements disposed between the outer ring and the inner ring; and an inner ring guide type retainer having a plurality of pockets for retaining the plurality of rolling elements at predetermined intervals in the circumferential direction, wherein grooves extending in the axial direction are formed on the inner circumferential face of the retainer, and in a case that the displacement amount of the center of the retainer is xi, the inner diameter of the retainer is Dic, the guide diameter of the inner ring is Dig, the circumferential width of the groove is h, the guide clearance between the inner ring and the retainer is $\Delta Li$, and the clearance between the pocket and the rolling element is $\Delta P$, the following relational expressions:

[Mathematical expression 3]

$$x_i = \frac{1}{2}\left(D_{ig} - D_{ic} + \sqrt{D_{ic}^2 - h^2} - \sqrt{D_{ig}^2 - h^2}\right) \quad (3)$$

[Mathematical expression 4]

$$\frac{\Delta L_i + 2x_i}{\Delta P} < 1 \quad (4)$$

are satisfied.

* * * * *